(12) United States Patent
Moon et al.

(10) Patent No.: US 9,487,106 B2
(45) Date of Patent: Nov. 8, 2016

(54) PASSENGER DETECTING SENSOR AND METHOD OF MANUFACTURING THE SAME

(71) Applicant: HYUNDAI MOBIS Co., Ltd, Yongin-si, Gyeonggi-do (KR)

(72) Inventors: Jin Ki Moon, Suwon-si (KR); You Tae Park, Seoul (KR); Kwang Taek Lim, Suwon-si (KR); Young Soo Hwang, Suwon-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 641 days.

(21) Appl. No.: 14/016,333

(22) Filed: Sep. 3, 2013

(65) Prior Publication Data

US 2014/0184246 A1 Jul. 3, 2014

(30) Foreign Application Priority Data

Dec. 28, 2012 (KR) .................. 10-2012-0156996

(51) Int. Cl.
*C23F 1/00* (2006.01)
*B60N 2/00* (2006.01)
(52) U.S. Cl.
CPC .......... *B60N 2/002* (2013.01); *Y10T 29/49002* (2015.01)
(58) Field of Classification Search
None
See application file for complete search history.

(56) References Cited

U.S. PATENT DOCUMENTS

| 2005/0064140 A1* | 3/2005 | Furuya | C08J 5/18 428/141 |
| 2008/0073130 A1 | 3/2008 | Bulgajewski et al. | |
| 2009/0003008 A1* | 1/2009 | Ohtake | B60Q 1/10 362/467 |
| 2009/0230835 A1* | 9/2009 | Tsuchimoto | G02B 1/11 313/112 |
| 2011/0115738 A1* | 5/2011 | Suzuki | G01L 1/205 345/173 |
| 2012/0125914 A1* | 5/2012 | Yue | H05B 3/34 219/548 |

FOREIGN PATENT DOCUMENTS

KR 10-0885660 B1 2/2009
KR 10-2011-0119310 A 11/2011

* cited by examiner

*Primary Examiner* — Shamim Ahmed
(74) *Attorney, Agent, or Firm* — Paratus Law Group, PLLC

(57) ABSTRACT

The present invention relates to a passenger detecting sensor which is installed in a seat to detect whether a passenger is seated on a seat, and a method of manufacturing the same. A method of manufacturing a passenger detecting sensor includes printing corrosion preventive ink on aluminum bonded on a flexible panel in accordance with a pattern; forming an aluminum pattern by corroding the aluminum; cleaning the corrosion preventive ink on the aluminum pattern; and printing a carbon paste on the aluminum pattern.

9 Claims, 5 Drawing Sheets

(S1)

(S2)

(S3)

(S4)

(S5)

PASSENGER DETECTING SENSOR AND METHOD OF MANUFACTURING THE SAME

CROSS-REFERENCE TO RELATED APPLICATIONS

The present application claims priority to Korean Patent Application Number 10-2012-156996 filed Dec. 28, 2012, the entire contents of which the application is incorporated herein for all purposes by this reference.

TECHNICAL FIELD

The present invention relates to a passenger detecting sensor and a method of manufacturing the same, and more particularly, to a passenger detecting sensor which is installed in a seat to detect whether a passenger is seated on the seat, and a method of manufacturing the same.

BACKGROUND

In general, various types of safety devices for safety of passengers are provided in an automobile, and an example of the safety devices is a seat belt which is a device that keeps the passenger in the seat when an accident occurs.

The passenger seated on the seat necessarily needs to fasten the seat belt for safety, and a passenger detecting device, which warns the passenger when the passenger does not fasten the seat belt after being seated on the seat, is provided in the recent automobile.

The passenger detecting device includes a passenger detecting sensor disposed in the seat to detect whether the passenger is seated on the seat, and a body control module (BCM) that determines whether the passenger is seated on the seat by receiving a signal from the passenger detecting sensor, and makes a warning sound while allowing a warning light to be turned on in order for the passenger to fasten the seat belt when the passenger is seated on the seat.

The passenger detecting sensor is operated in a switch manner where the passenger detecting sensor is pressed by a load of the passenger so that two conductive member are in contact with each other, and is configured to be pressed and operated even by small women constituting 5% of the total women according to the regulations.

Because the conductive members of the passenger detecting sensor are formed of silver paste that is expensive, there is a problem in that costs are increased.

SUMMARY

The present invention has been made in an effort to provide a passenger detecting sensor and a method of manufacturing the same, capable of reducing costs and improving performance.

Objects of the present invention are not limited to the objects described above, and other objects that are not described will be clearly understood by a person skilled in the art from the description below.

An exemplary embodiment of the present invention provides a method of manufacturing a passenger detecting sensor including: printing corrosion preventive ink on aluminum bonded on a flexible panel in accordance with a pattern; forming an aluminum pattern by corroding the aluminum; cleaning the corrosion preventive ink on the aluminum pattern; and printing a carbon paste on the aluminum pattern.

Another exemplary embodiment of the present invention provides a passenger detecting sensor including: two flexible panels; two aluminum patterns formed on the two panels by an aluminum etching method, respectively; two carbon paste printed on the two aluminum patterns, respectively; and a bonding member configured to bond the two panels so that a side on which the carbon paste is formed is disposed at an inner side, and allows the two carbon paste to be spaced apart from each other.

Details of other exemplary embodiments are included in the detailed description and the drawings.

DETAILED DESCRIPTION

Figure 1:
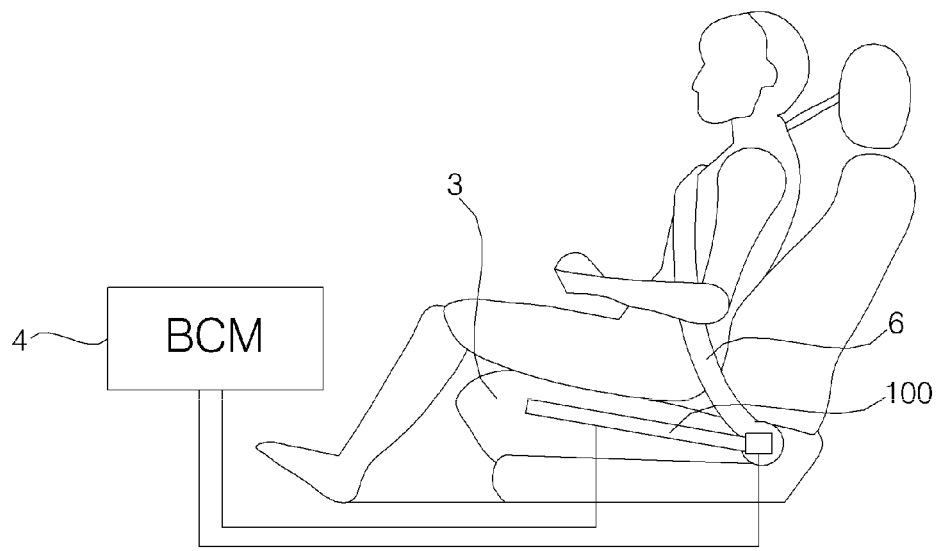
FIG. 1 is a view illustrating a passenger detecting device of an automobile including a passenger detecting sensor according to an exemplary embodiment of the present invention.

The advantages and characteristics of the present invention and methods for achieving the same will become clear from the embodiments set forth in detail below with reference to the attached drawings. However, the present invention is not limited to the embodiments set forth below, and may be embodied in various other forms. The present embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals represent like elements throughout the specification.

Hereinafter, a passenger detecting sensor and a method of manufacturing the same according to an exemplary embodiment of the present invention will be described with respect to the drawings.

FIG. 1 is a view illustrating a passenger detecting device of an automobile including a passenger detecting sensor according to an exemplary embodiment of the present invention.

Referring to FIG. 1, as a seat belt reminder (SBR) system to remind the passenger in a case in which the passenger seated on a seat 3 does not fasten a seat belt 6, a passenger detecting device of an automobile including a passenger detecting sensor 100 according to the exemplary embodiment of the present invention includes a passenger detecting sensor 100 disposed in the seat 3, and a control unit (body control module (BCM)) 4 connected to the passenger detecting sensor 100 to determine whether the passenger is seated on the seat 3 and determine whether the passenger fastens the seat belt 6 when the passenger is seated on the seat 3.

The passenger detecting sensor 100 is installed in the seat 3 to detect whether the passenger is seated on the seat 3 while being switch operated when the seat 3 is pressed by a load of the passenger seated on the seat 3.

The control unit 4 supplies a predetermined voltage to the passenger detecting sensor 100 and thereafter determines whether the passenger is seated on the seat 3 in accordance with whether voltage drop of an outputted voltage occurs. That is, when the passenger detecting sensor 100 is switched on by the load of the passenger seated on the seat 3, linear resistance of the passenger detecting sensor 100 is increased to drop the outputted voltage. Therefore, the control unit 4 may determine that the passenger is seated on the seat 3 when the voltage, which is outputted from the passenger detecting sensor 100, drops.

Of course, in a case in which the passenger does not fasten the seat belt 6 after being seated on the seat 3, the control unit 4 controls warning sound and/or a warning light so as to be operated to remind the passenger to fasten the seat belt 6.

Figure 2:
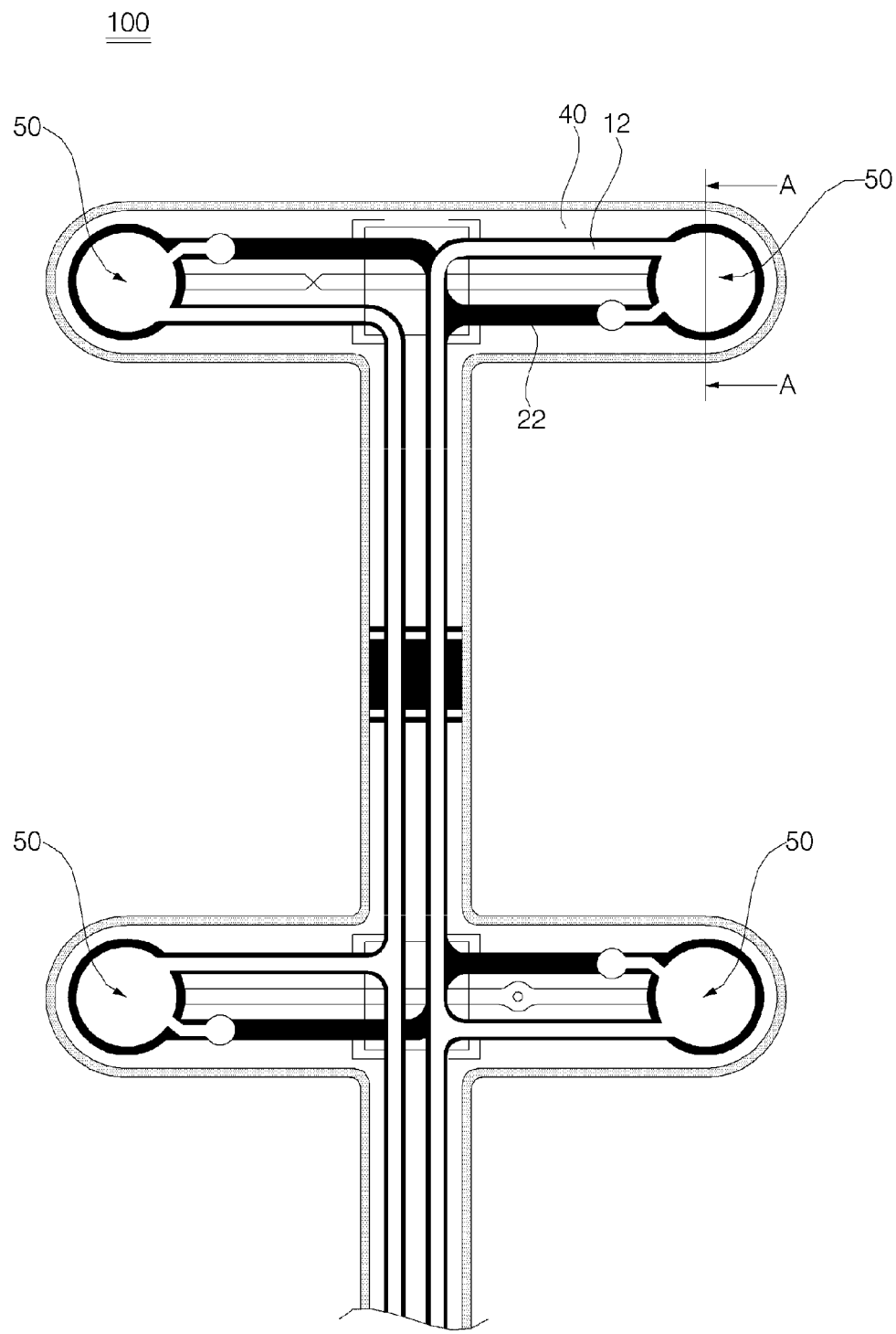
FIG. 2 is a top view illustrating the passenger detecting sensor illustrated in FIG. 1.

FIG. 2 is a top view illustrating the passenger detecting sensor illustrated in FIG. 1.

The passenger detecting sensor 100 includes an exterior panel 40 that may be bent by the load of the passenger seated on the seat 3, and first and second conductive members 12 and 22 that are disposed in the exterior panel 40.

A plurality of switch portions 50, where the first conductive member 12 and the second conductive member 22 come into contact with each other when the exterior panel 40 is bent by the load of the passenger, is formed at the passenger detecting sensor 100. The passenger detecting sensor 100 outputs voltages, which are different from each other, as the plurality of switch portions 50 is operated on/off by the load of the passenger seated on the seat 3.

The switch portions 50 may be formed as parts of the first conductive member 12 and the second conductive member 22 are expanded in circular shapes to have broader areas than the remainder parts so that the first conductive member 12 and the second conductive member 22 are disposed to face each other.

Figure 3:
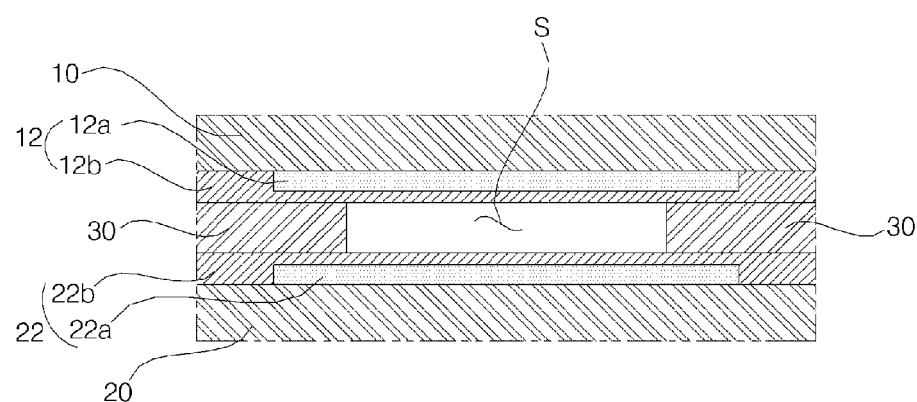
FIG. 3 is a cross-sectional view of the passenger detecting sensor taken along line A-A of FIG. 2.
Figure 4:
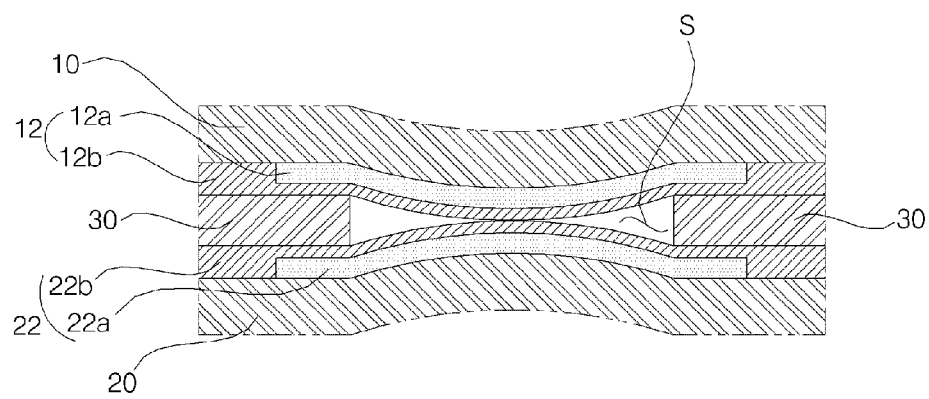
FIG. 4 is an operational view illustrating a state according to a load of a passenger against a cross section of the passenger detecting sensor of FIG. 3.

FIG. 3 is a cross-sectional view of the passenger detecting sensor taken along the line A-A of FIG. 2, and FIG. 4 is an operational view illustrating a state according to a load of a passenger against a cross section of the passenger detecting sensor of FIG. 3.

The passenger detecting sensor 100 is formed by attaching two panels 10 and 20 respectively having a surface at which the conductive member is disposed. That is, the exterior panel 40 includes a first panel 10 that is disposed at an upper side of the passenger detecting sensor 100, and a second panel 20 that is disposed at a lower side of the passenger detecting sensor 100. In the present exemplary embodiment, the first panel 10 and the second panel 20 are formed of a flexible polyethylene terephthalate (PET) material, respectively.

The first conductive member 12 is formed on a surface of the first panel 10 and the second conductive member 22 is formed on a surface of the second panel 20, and therefore the first panel 10 and the second panel 20 are bonded. After the first panel 10 and the second panel 20 are disposed so that the first conductive member 12 and the second conductive member 22 face each other, the first conductive member 12 and the second conductive member 22 are attached by a bonding member 30, and therefore the first panel 10 and the second panel 20 are bonded. In the present exemplary embodiment, the bonding member 30 is a double-sided tape.

According to the exemplary embodiment, the bonding member 22 may directly attach the first panel 10 and the second panel 20.

The bonding member 30 bonds the first panel 10 and the second panel 20 so that a separated space S is formed between the first conductive member 12 and the second conductive member 22. The bonding member 30 allows the first conductive member 12 and the second conductive member 22 to be spaced apart from each other so that the first conductive member 12 and the second conductive member 22 are switch operated while coming into contact with each other or moving away from each other when the first panel 10 and the second panel 20 are bent by the load of the passenger occupying the seat 3.

The first conductive member 12 includes a first aluminum pattern 12a which is formed on a surface of the first panel 10 by an aluminum etching method, and a first carbon paste 12b which is made of a carbon material and is formed by being printed on the first aluminum pattern 12a in order to prevent oxidation of the first aluminum pattern 12a. The first carbon paste 12b may be formed on a part of the first panel 10 in order to completely cover the first aluminum pattern 12a.

The second conductive member 22 is formed to have the same structure as the first conductive member 12. That is, the second conductive member 22 includes a second aluminum pattern 22a formed on a surface of the second panel 20 by an aluminum etching method, and a second carbon paste 22b which is made of a carbon material and is formed by being printed on the second aluminum pattern 22a in order to prevent oxidation of the second aluminum pattern 22a. The second carbon paste 22b may be formed on a part of the second panel 20.

The bonding member 30 may bond the first panel 10 and the second panel 20 by attaching the first carbon paste 12b and the second carbon paste 22b. The bonding member 30 bonds the first panel 10 and the second panel 20 so that a separated space S is formed between the first carbon paste 12b and the second carbon paste 22b. According to the exemplary embodiment, the bonding member 22 may directly attach the first panel 10 and the second panel 20.

The bonding member 30 allows the first carbon paste 12b and the second carbon paste 22b to be spaced apart from each other so that a switch on state may be made by allowing the first carbon paste 12b and second carbon paste 22b to be in contact with each other in the space S while the first panel 10 and the second panel 20 are pressed and bent when the seat 3 is pressed by the load of the passenger seated on the seat 3.

Referring to FIG. 3, in a case in which the seat 3 is not occupied, the first carbon paste 12b and the second carbon paste 22b of the passenger detecting sensor 100 are spaced apart from each other.

Referring to FIG. 4, in a case in which the passenger is seated on the seat 3, the first carbon paste 12b and the second carbon paste 22b of the passenger detecting sensor 100 come into contact with each other. When the first carbon paste 12b and second carbon paste 22b are in contact with each other, the first aluminum pattern 12a and the second aluminum pattern 22a are electrically connected to each other. When the first aluminum pattern 12a and the second aluminum pattern 22a are electrically connected to each other, the linear resistance of a circuit is increased to drop the voltage, and therefore the control unit 4 may determine that the passenger is seated on the seat 3.

Figure 5:
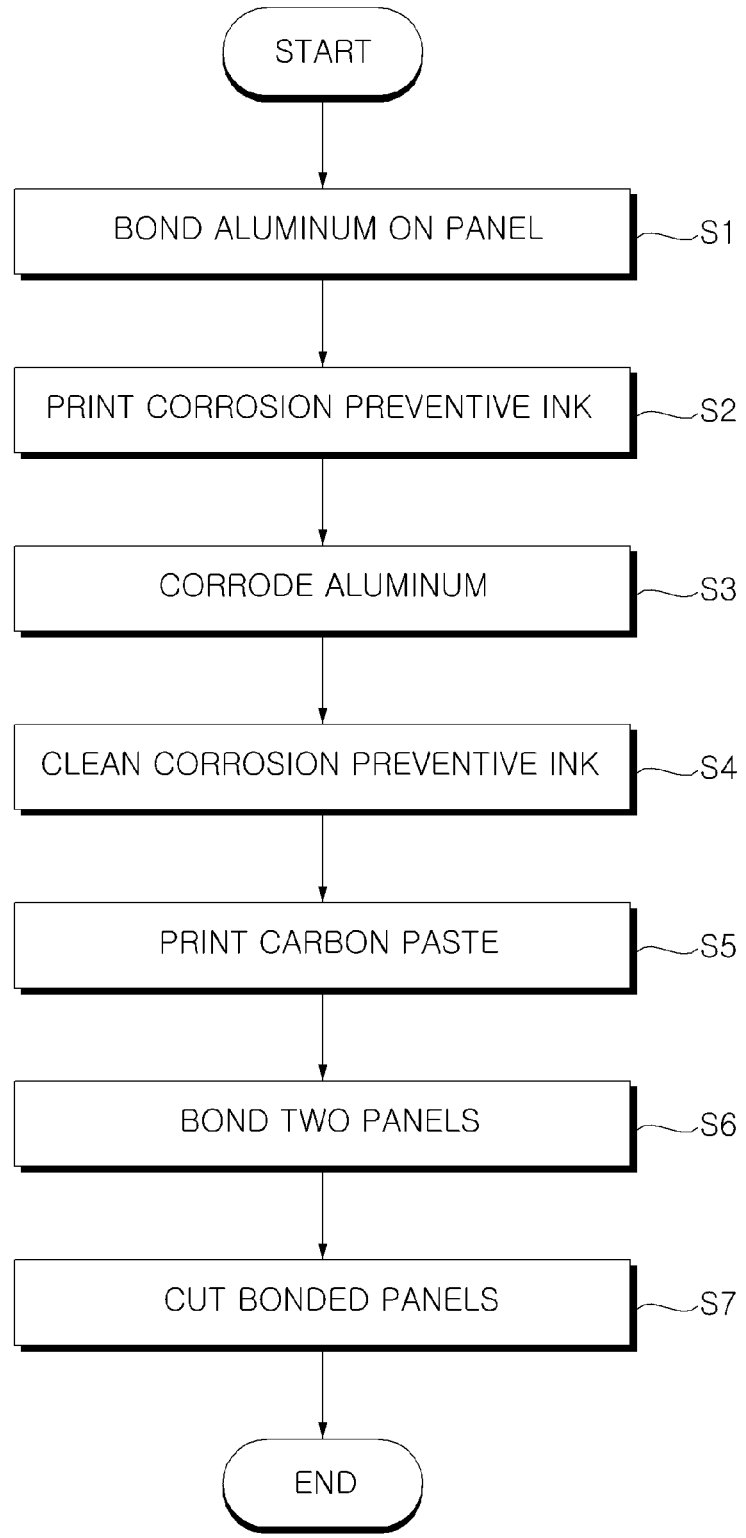
FIG. 5 is a flow chart of a method of manufacturing the passenger detecting sensor according to the exemplary embodiment of the present invention.
Figure 6:
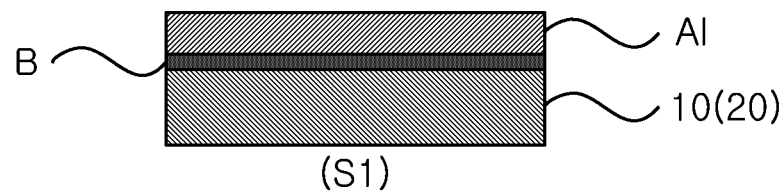
FIG. 6 is a view illustrating a step-by-step process of forming the passenger detecting sensor in the method of manufacturing the passenger detecting sensor of FIG. 5.
Figure 6:
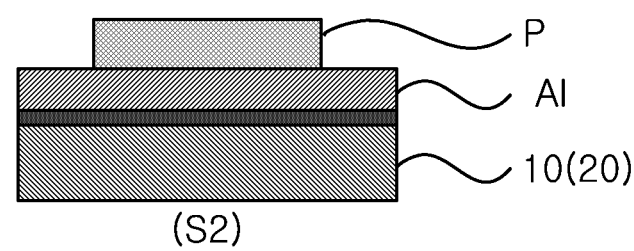
Figure 6:
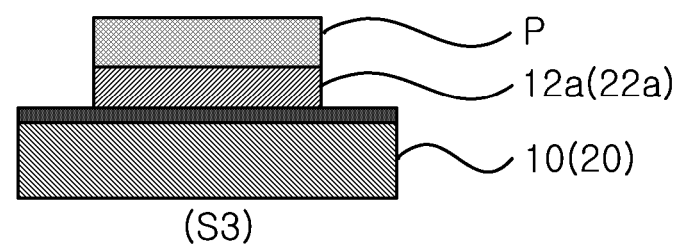
Figure 6:
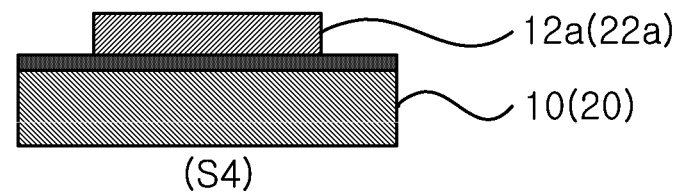
Figure 6:
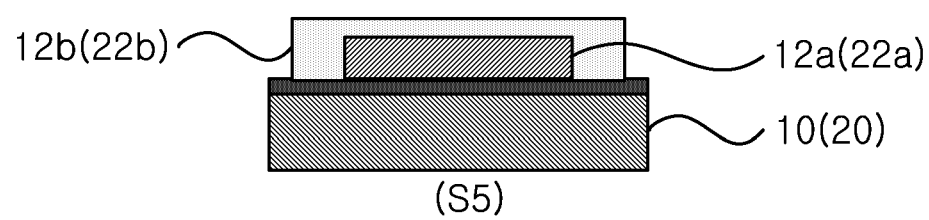

FIG. 5 is a flow chart of a method of manufacturing the passenger detecting sensor according to the exemplary embodiment of the present invention, and FIG. 6 is a view illustrating a step-by-step process of forming the passenger detecting sensor in the method of manufacturing the passenger detecting sensor of FIG. 5.

Aluminum Al is bonded on the panels 10 and 20 (S1). The aluminum Al on the panels 10 and 20 is attached and bonded by a bonding resin B.

Corrosion preventive ink P is printed on the aluminum Al (S2). The corrosion preventive ink P is printed on the aluminum Al bonded on the panels 10 and 20 in accordance with a pattern. The pattern in which the corrosion preventive ink P is printed is a pattern that coincides with the aluminum patterns 12a and 22a. The corrosion preventive ink P printed on the aluminum Al may be dried.

The aluminum Al is then corroded (S3). The aluminum Al except for a portion on which the corrosion preventive ink P is printed is corroded by a corrosive agent. As the corrosive agent acts, only the aluminum Al on which the corrosion preventive ink P is printed remains in accordance with a pattern of the corrosion preventive ink P to form the aluminum patterns 12a and 22a.

Next, the corrosion preventive ink is cleaned (S4). The corrosion preventive ink P on the aluminum patterns 12a and 22a is cleaned and removed. When the corrosion preventive ink P is removed, only the aluminum patterns 12a and 22a remain on the panels 10 and 20.

The aforementioned steps S2 to S4 correspond to an aluminum etching method, and the aluminum patterns 12a and 22a are formed by the aluminum etching method.

The carbon paste 12b and 22b is printed on the aluminum patterns 12a and 22a (S5). The carbon paste 12b and 22b is printed so as to completely cover the aluminum patterns 12a and 22a to prevent oxidation of the aluminum patterns 12a and 22a. The carbon paste 12b and 22b does not coincide with patterns of the aluminum patterns 12a and 22a, and a part of the carbon paste is printed on the panels 10 and 20. The printed carbon paste 12b and 22b may be dried.

Two panels 10 and 20 are bonded (S6). The first panel 10 on which the first aluminum pattern 12a and the first carbon paste 12b are formed through the aforementioned steps S1 to S5 and the second panel 20 on which the second aluminum pattern 22a and the second carbon paste 22b are formed through the aforementioned steps S1 to S5 are bonded by the bonding member 30.

The first panel 10 and the second panel 20 are bonded so that a side of the first panel 10 where the first aluminum pattern 12a and the first carbon paste 12b are formed and a side of the second panel 20 where the second aluminum pattern 22a and the second carbon paste 22b are formed are disposed at an inner side. That is, when the first panel 10 and the second panel 20 are bonded, the first carbon paste 12b and the second carbon paste 22b are disposed to face each other.

The bonding member 30 attaches the first carbon paste 12b and the second carbon paste 22b to bond the first panel 10 and the second panel 20. The bonding member 30 bonds the first panel 10 and the second panel 20 so that a separated space S is formed between the first carbon paste 12b and the second carbon paste 22b. According to the exemplary embodiment, the bonding member 22 may directly attach the first panel 10 and the second panel 20.

The bonded two panels 10 and 20 are cut (S7). When the bonded first panel 10 and second panel 20 are cut in accordance with a predetermined shape, the exterior panel 40 is formed, and the passenger detecting sensor 100 is completed.

In the above, while exemplary embodiments of the present invention have been illustrated and described, the present invention is not limited to the specific embodiments described above, and various modified embodiments are possible by those having ordinary skill in the technical field to which the present invention pertains without departing from the spirit of the present invention as defined by the scope of the claims, and such modified embodiments should not be interpreted as lying outside of the technical concept or the object of the present invention.

The passenger detecting sensor and the method of manufacturing the same according to the present invention have one or more of the following effects.

First, the aluminum is used for the conductive member, and therefore costs may be decreased.

Second, the aluminum pattern of which dispersion of output resistance is very low is used for the conductive member, and therefore, performance thereof may be increased.

Finally, the aluminum pattern is formed by the aluminum etching method, and as a result a manufacturing process may be simplified.

The effects of the present invention are not limited to the effects described above, and a person of ordinary skill in the art will clearly understand other effects that are not described from the description of the scope of the claims.

What is claimed is:

1. A method of manufacturing a passenger detecting sensor, comprising:
    printing corrosion preventive ink on aluminum bonded on a flexible panel in accordance with a pattern;
    forming an aluminum pattern by corroding the aluminum;
    cleaning the corrosion preventive ink on the aluminum pattern; and
    printing a carbon paste on the aluminum pattern.

2. The method of claim 1, further comprising:
    attaching and bonding the aluminum on the flexible panel by bonding resin.

3. The method of claim 1, further comprising:
    drying the corrosion preventive ink printed on the aluminum.

4. The method of claim 1, wherein the carbon paste is printed to completely cover the aluminum pattern, and a part of the carbon paste is printed on the panel.

5. The method of claim 1, further comprising:
    drying the carbon paste printed on the aluminum pattern.

6. The method of claim 1, further comprising,
    bonding two panels by a bonding member so that a surface on which the carbon paste is formed is disposed at an inner side,
    wherein a separated space is formed between the two carbon paste.

7. The method of claim 6, wherein the bonding member attaches the carbon paste provided on the two panels, respectively.

8. The method of claim 6, wherein the bonding member directly attaches the two panels.

9. The method of claim 6, further comprising:
    cutting the bonded two panels.

* * * * *